United States Patent
Shemer et al.

(10) Patent No.: US 11,921,585 B2
(45) Date of Patent: Mar. 5, 2024

(54) RUN-TIME SELECTION OF OPTIMAL COMMANDS FOR ACCESSING SERIAL ACCESS RESOURCES

(71) Applicant: Dell Products L.P., Round Rock, TX (US)

(72) Inventors: Jehuda Shemer, Kfar Saba (IL); Zion Drori, Ra'anana (IL); Maxim Drobachevsky, Beer Sheva (IL)

(73) Assignee: Dell Products L.P., Round Rock, TX (US)

(*) Notice: Subject to any disclaimer, the term of this patent is extended or adjusted under 35 U.S.C. 154(b) by 1 day.

(21) Appl. No.: 17/678,306

(22) Filed: Feb. 23, 2022

(65) Prior Publication Data

US 2023/0267049 A1    Aug. 24, 2023

(51) Int. Cl.
*G06F 11/14* (2006.01)
*G06F 11/30* (2006.01)
*G06F 11/34* (2006.01)

(52) U.S. Cl.
CPC ...... *G06F 11/1451* (2013.01); *G06F 11/1461* (2013.01); *G06F 11/1464* (2013.01); *G06F 11/1469* (2013.01); *G06F 11/3075* (2013.01); *G06F 11/3409* (2013.01)

(58) Field of Classification Search
CPC .............. H01R 13/641; H01R 13/6272; H01R 2201/26
USPC ......................................................... 714/36
See application file for complete search history.

(56) References Cited

U.S. PATENT DOCUMENTS

2016/0044628 A1*   2/2016   Nakao ................... H04W 4/023
                                                                    455/456.2

OTHER PUBLICATIONS

Wikipedia "EEPROM" page from date Feb. 11, 2022, retrieved from https://web.archive.org/web/20220211140356/https://en.wikipedia.org/wiki/EEPROM (Year: 2022).*

(Continued)

*Primary Examiner* — Yair Leibovich
(74) *Attorney, Agent, or Firm* — Dergosits & Noah LLP; Todd A. Noah

(57) ABSTRACT

Run-time selection of optimal commands for accessing serial access resources is described. A system receives a request to access a serial access resource. The system identifies a first section to access in the serial access resource and a second section to access in the serial access resource which is separated from the first section to access by an intermediate section in the serial access resource. The system generates combinations of access commands associated with accessing the first and the second sections to access. The system estimates target values, based on locations of the first and the second sections to access in the serial access resource, corresponding to the combinations of access commands. The system selects a combination of access commands which corresponds to an optimal target value. The system enables performance of the selected combination of access commands on the first and the second sections in the serial access resource.

20 Claims, 4 Drawing Sheets

(56) References Cited

OTHER PUBLICATIONS

Stack exchange "EEPROM data check" page from date Jan. 18, 2021, retrieved from https://web.archive.org/web/20210118112603/https://electronics.stackexchange.com/questions/90820/eeprom-data-check (Year: 2021).*

"M24C01-RMN6P Datasheet (PDF)", DocID024020 Rev 6, Oct. 2017, retrieved from https://www.mouser.com/ProductDetail/STMicroelectronics/M24C01-RMN6P?qs=DEIWxvUolVxhjPL96PebsQ%3D%3D (Year: 2017).*

* cited by examiner

| Section | | A | | B | | C | | D | | E | |
|---|---|---|---|---|---|---|---|---|---|---|---|
| Locations | 0-255 | 256-319 | 320-383 | 384-447 | 448-511 | 512-639 | 640-2047 | 2048-2175 | 2176-4095 | 4096-4159 | 4160-4223 |

| # | Option | # Handles | # Opens | #Seeks | # Reads | # Closes | KB read 202 | Max Parallel | Total Commands 204 | Time Required 206 |
|---|---|---|---|---|---|---|---|---|---|---|
| 1 | A, B, C, D, E | 1 | 1 | 5 | 5 | 1 | 448 | 1 | 12 | 477.24 |
| 2 | A, B, C, D, E | 5 | 5 | 5 | 5 | 5 | 448 | 5 | 20 | 415.64 |
| 3 | ABCDE | 1 (read through) | 1 | 1 | 1 | 1 | 3904 | 1 | 4 | 434.52 |
| 4 | ABC, D, E | 3 | 3 | 3 | 3 | 3 | 576 | 3 | 12 | 416.92 |
| 5 | ABC, D, E | 1 | 1 | 3 | 3 | 1 | 576 | 1 | 8 | 447.88 |
| 6 | AB, CD, E | 3 | 3 | 3 | 3 | 3 | 1920 | 3 | 12 | 423.32 |
| 7 | AB, CD, E | 3 | 3 | 5 | 5 | 3 | 448 | 3 | 16 | 431.28 |

RUN-TIME SELECTION OF OPTIMAL COMMANDS FOR ACCESSING SERIAL ACCESS RESOURCES

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

A data storage system may store a data object on a storage array, which may be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

A serial access resource, such as a data file, data stream, or object store element, can be defined as a physical or virtual computer component which is designed to perform optimally when used for sequentially reading contiguous data and/or sequentially writing contiguous data. Serial access resources are usually abstracted out using a handle interface that includes an open command, a seek command, a read command, a read from location command, a write command, a close command, and possibly other commands, which may also be referred to as operations. However, a serial access resource is not designed to perform optimally when reading non-contiguous data or writing non-contiguous data. For example, when a user's laptop computer is receiving multiple small sections of non-contiguous data which are being read from a backup file during a partial restore, the restore time may be relatively slow due to latencies in some commands, such as open, seek, and close commands which may require a relatively long time to establish connections and/or allocate shared resources.

DETAILED DESCRIPTION

The performance issues caused when accessing non-contiguous data on a serial access resource can depend on the specific access commands, the specific serial access resource, and the accessed sections' locations on the serial access resource. The accessed sections' locations on the serial access resource can also effect which combination of access commands should be selected, the performance of each possible combination of access commands, and which combination of access commands offers the optimal performance. Different computer systems' deployments, loads, networks, and costs can affect what combination of access commands are optimal for accessing each serial access resource. Therefore, a serial access optimizer can take multiple considerations into account and make real-time selections of a combination of access commands to optimize access to a serial access resource according to a specific optimization target, which may be the smallest bandwidth, the fastest time, or the lowest cost.

Figures 1, 2:
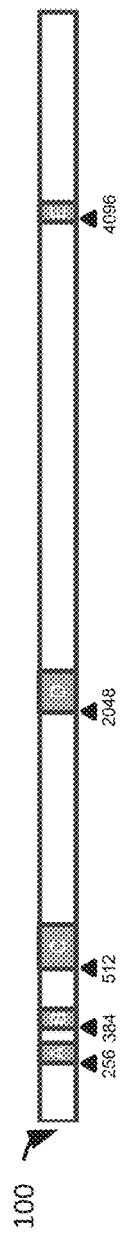
FIG. 1 illustrates a block diagram of an example serial access resource and a corresponding section locations table for run-time selection of optimal commands for accessing serial access resources, under an embodiment.
FIG. 2 illustrates a block diagram of an example table of options of combinations of access commands for run-time selection of optimal commands for accessing serial access resources, under an embodiment.

The following examples of different locations of sections accessed in a serial access resource and possible combinations of access commands illustrate different results. FIG. 1 depicts an example of accessing five non-contiguous areas, illustrated as the sections A, B, C, D, and E, in a serial access resource 100. FIG. 1 also depicts a table 102 which lists the locations of the sections A, B, and E, which are 64 kilobytes (KB) in length, and the locations of the sections C and D, which are 128 KB in length.

FIG. 2 depicts an example table 200 which lists a few options for 7 combinations of access commands for reading data from the five non-contiguous sections A, B, C, D, and E in the serial access resource 100 depicted by FIG. 1. As illustrated by these examples, after an open command is performed to open access to a serial access resource, a seek command is performed to seek a location on the opened serial access resource, unless the location sought on the serial access resource is location 0, which is a rarely accessed location on serial access resources. There are many more possible combinations of access commands than listed by the table 200 in FIG. 2, but the 7 listed combinations of access commands will suffice for explaining the examples of accessing serial access resources.

Embodiments herein enable run-time selection of optimal commands for accessing serial access resources. A system receives a request to access a serial access resource. The system identifies a first section to access in the serial access resource and a second section to access in the serial access resource which is separated from the first section to access by an intermediate section in the serial access resource. The system generates combinations of access commands associated with accessing the first section to access and the second section to access. The system estimates target values, based on locations of the first section to access and the second section to access in the serial access resource, corresponding to the combinations of access commands. The system selects a combination of access commands which corresponds to an optimal target value. The system enables performance of the selected combination of access commands on the first section and the second section in the serial access resource.

For example, a serial access optimizer on a laptop computer receives a request from the laptop's user to partially restore a laptop data file from a backup file stored on a storage array. The serial access optimizer identifies the sections of the backup file which store data needed for the partial restore, which include the sections A, B, C, D, and E, as depicted by the serial access resource 100 in FIG. 1. The serial access optimizer generates the 7 options of the combinations of access commands, listed in table 200, which can read the sections A, B, C, D, and E in the backup file. For each of the 7 options of combinations of access commands, the serial access optimizer estimates the total data read, which are listed in the KB read column 202, the total number of open, seek, read, and close commands, which is listed in the total commands column 204, and the time required to execute open, seek, read, and close commands, and transfer data, which is listed in the time required column 206. Since options #1, #2, and #7 for the combinations of access commands each have the same minimum of 448 KB of data read in the KB read column 202, the serial access optimizer uses the total number of commands listed in the total commands column 204 for options #1, #2, and #7 as the tie-breaker, and selects option #1, which has 12 open, seek, read, and close commands, whereas option #2 has 20 open, seek, read, and close commands, and option #7 has 16 open, seek, read, and close commands. Therefore, the serial access optimizer sends the selected combination of access commands for option #1, which are 1 open command, 5 seek commands, 5 read commands, and 1 close command to the backup file on the storage array, which performs the optimal commands of open backup file, seek the section A, read the section A, seek the section B, read the section B, seek the section C, read the section C, seek the section D, read the section D, seek the section E, read the section E, and close the backup file.

Figure 3:
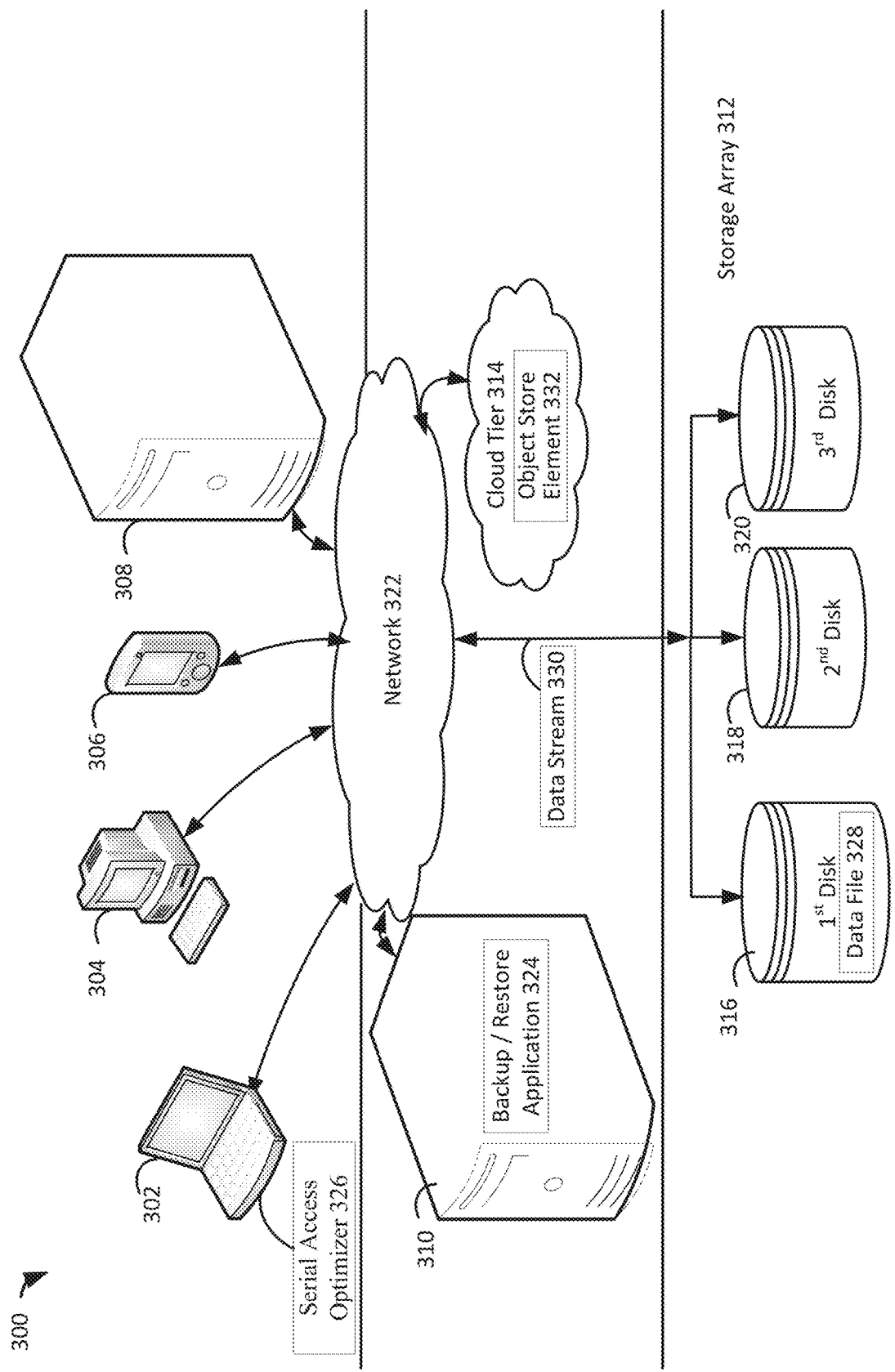
FIG. 3 illustrates a block diagram of an example system for run-time selection of optimal commands for accessing serial access resources, under an embodiment.

FIG. 3 illustrates a diagram of a system 300 for run-time selection of optimal commands for accessing serial access resources, under an embodiment. As shown in FIG. 3, the system 300 may illustrate a cloud computing environment in which data, applications, services, and other application resources are stored and delivered through shared data centers and appear as a single point of access for the users. The system 300 may also represent any other type of distributed computer network environment in which servers control the storage and distribution of application resources and services for different client users.

In an embodiment, the system 300 represents a cloud computing system that includes a first client 302, a second client 304, a third client 306, and a fourth client 308, and a server 310, a storage array 312, and a cloud tier 314 that may be provided by a hosting company. The storage array 312 may include a first disk 316, a second disk 318, and a third disk 320. The clients 302-308, the server 310, the storage array 312, and the cloud tier 314 may communicate via a network 322.

Although FIG. 3 depicts the first client 302 as a laptop computer 302, the second client 304 as a desktop computer 304, the third client 306 as a smartphone 306, and the fourth client 308 as a server 308, each of the clients 302-308 may be any type of computer. Even though FIG. 3 depicts the system 300 with four clients 302-308, one server 310, one storage array 312, one cloud tier 314, three disks 316-320, and one network 322, the system 300 may include any number of clients 302-308 any number of servers 310, any number of storage arrays 312, any number of cloud tiers 314, any number of disks 316-320, and any number of networks 322. The clients 302-308 and the server 310 may each be substantially like the system 500 depicted in FIG. 5 and described below.

The server 310, which may be referred to as a backup server 310, can include a backup/restore application 324 that can create backup files of data objects for the clients 302-308, and execute a restore based on the backup files stored on the storage array 312 and/or the cloud tier 314. The backup/restore application 324 can provide centralized administration, such as scheduling, monitoring, and managing backup operations and backup files. The backup/restore application 324 can enable the storing of backup operation schedules, client policies, and client configurations. The backup/restore application 324 can provide a unique interface to the clients 302-308 during login and assist the backup server 310 in authenticating and registering the clients 302-308. Although the application 324 executing on the server 310 is described as a backup/restore application 324, other types of applications may be used. Other types of applications may include an application that accesses targeted search results, accesses media excerpts in data repositories (such as video sections for a news report), accesses article references (such as bookmarks), accesses reviews of edited sections in a document, or any other type of application which needs to access specific parts of a larger object which is stored on any type of serial access media, such as a file or an object store.

The backup/restore application 324 can send backup/restore work orders to the clients 302-308, which can receive and process the work orders to start a backup or restore operation. The backup/restore application 324 can maintain a local database of all processes that execute on the backup server 310. The backup/restore application 324 can execute server-side processes for a system administrator's graphical management console, which may enable the system administrator to use command line interface tools for queries. For example, a system administrator identifies the clients 302-308 registered with the backup server 310.

The client 302 may include a serial access optimizer 326, which can select the optimal commands to access serial access resources, such as the data file 328 that may be stored on the first disc 316, the data stream 330 that may be communicated via the network 322, and the object store element 332, which may be stored on the cloud tier 314. Although FIG. 1 depicts one serial access optimizer 326 residing completely on the client 302, one data file 328 residing completely on the first disc 316, one data stream 330 transmitted completely via the network 322, and one object store element 332 residing completely on the cloud tier 314, any number of the serial access optimizer 326, the data file 328, the data stream 330, and the object store element 332 may reside in any combination of partially or completely on the clients 302-308, on the backup server 310, on another server which is not depicted in FIG. 3, on the cloud tier 314, on the discs 316-320, and on the network 322.

Different serial access resources may have different performance profiles for each access command. The following examples illustrate the diversity of such performance profiles. For example, the open command and the close command require a relatively significant amount of time when performed on Network File System (NFS) files. Other than the time to actually read data from a NFS file, the time required for the read command itself has relatively little to no effect on performance. Similarly, the performance of reading from a NFS file is negligibly affected by a preceding seek command.

An open command performed on a data stream system may require several hundreds of milliseconds or even a few seconds when under a heavy load. A read command can perform optimally for a data stream system for long sequential reads, up to reads that are megabytes in length, after which the increase in the size of the data read has a relatively minimal effect on performance. Internal optimization, such as prefetching data and data storage caches, may affect the performance of read commands for data stream systems. A data stream system may have a limit on the bandwidth provided for a single data stream, which may be related to the system's maximum network bandwidth. Seek commands are performed relatively fast for data stream systems.

The reading of data from a cloud tier 314 may be performed by a single read command up to a maximum size of data read. A cloud tier 314 may offer an option to read only a specific section (location and length) on an object store element, which may become particularly useful for reading relatively large object store elements. A cloud tier 314 may execute every access command as an HTTP command which requires establishing a TCP connection, and therefore has an associated command cost. Data sent outside of the cloud tier 314 has an associated cost which is proportional to the size of the data output (egress costs), while data that is used internally within a cloud tier 314 may have no associated size cost.

The serial access optimizer 326 may use a naïve combination generator to enumerate all possible combinations of access commands. Given a data pattern with N sections to read, the following algorithm may be used for generating combinations of access commands.

Loop on the number of handles K from 1 to N
Enumerate the ways to partition N consecutive items into K groups
In each of the K groups:
First section seek and read for each section in the group beyond the first section (iterate recursively)
1. Option to seek to a section and then read
2. Option to read from a current position to the end of a section The enumeration of partitions in the second line has C(N−1, K−1) combinations. The recursive enumeration of seek combinations has $2^{GroupSize-1}$ for each group in theory. To reduce system run-time, constraints may be provided which filter out many combinations of access commands or prevent many combinations of access commands from being generated. Fortunately, there are simple ways to significantly reduce the number of combinations of access commands by using a minimization model which defines the target for optimization. The selection of a combination of access commands as optimal may be based on the total data transferred, which effects bandwidth and network cost, if applicable, and the number of commands sent, which may affect latency time and cost, if applicable.

Bandwidth is minimized by sending the least amount of data over the network. If minimizing bandwidth is the target for optimization, then the serial access optimizer 326 enumerates combinations of access commands which perform a seek command before performing each read command. Consequently, when minimizing only bandwidth, there is no need for the serial access optimizer 326 to generate other combinations of access commands that do not include a seek command before each read command. A compression ratio, or other data reduction options, may be applied to bandwidth minimization estimations by multiplying the total data amount by the compression ratio.

The determination of which combination of access commands offers the fastest performance involves tradeoffs of the number of handles, which controls parallel processing of commands that can provide faster performance but require more computer resources such as memory and the CPU usage. Cost may also be minimized, which is applicable mainly in the cloud tier 314 to minimize the cost of operations. If minimizing the time or the cost is the target for optimization, and the size of the intermediate section between two sections to be read is smaller than a "radius," or a maximum seek distance, then the serial access optimizer 326 will enumerate combinations of access commands which will include a read command that will read the section that precedes the small intermediate section, read the intermediate section, and then read the section that follows the small intermediate section. However, if the intermediate section is larger than the radius' maximum seek distance, then the serial access optimizer 326 will enumerate combinations of access commands which include a seek command which is performed after the read command is performed for the preceding section which is before the intermediate section, and performed before the read command for the section which follows the intermediate section, because performing the seek option will be more efficient than performing a command to "read through" the intermediate section. Since cost parameters are mainly for the cloud tier 314, costs may be set to zero for other types of serial access resources. Other optimization targets are possible, such as memory use or CPU use, and additional constraints are also possible.

The following is a high-level algorithm for selecting the optimal combination of access commands for accessing a serial access resource and the parameters defined for the basic minimization model.

Option Chosen=null
Option Value=infinity/or some extremely high value
For each option X in {options enumeration}:
V=Calculate Value(X)
If (V<Option Value):
Option Chosen=X
Option Value=V
$BW_{Read}$=Average read bandwidth,
$T_{Open}$=Time to open a resource,
$T_{Seek}$=Time it takes to seek (which may be proportional to the seek distance),
$T_{Read}$=Time for a read command with no data read (the actual command latency),
$T_{Close}$=Time to close a resource,
$C_{Open}$=Cost of an open command,
$C_{Seek}$=Cost of a seek command,
$C_{Read}$=Cost of a read command,
$C_{Close}$=Time to close a resource,
$C_{egress}$=Cost of egress data transfer per unit (such as $/GB).

Additional parameters for other commands, such as for a write command, or for additional costs, may be defined in a similar fashion. The serial access optimizer 326 can determine some parameters for estimating the optimal target values by measuring and averaging the data from previous performances of access commands. The serial access optimizer 326 can maintain the overall average for each parameter, or even maintain a moving average that ensures that the values for parameters change over time with a host system's load and evolution.

For each combination of access commands, the serial access optimizer 326 may estimate the optimization target(s) as follows:

Total Data=Σ size of sections which are read

Time=#Opens*$T_{Open}$+#Seeks*$T_{Seek}$+#Reads*$T_{Read}$+ #Closes*$T_{Close}$+Total Data/$BW_{Read}$ Cost=#Opens*$C_{Open}$+#Seeks*$C_{Seek}$+#Reads*$C_{Read}$+ #Closes*$C_{Close}$+Total Data*$C_{egress}$ The serial access optimizer 326 can select the combination of access commands which corresponds to the estimated target value that was the minimum of the estimated target values which were selected for optimization. In case of a tiebreaker, the serial access optimizer 326 can use the second priority for optimization, and then the third priority for optimization, etc. This means that the serial access optimizer 326 stores the estimated target value which is the "best" target value so far and the new target value which was estimated for a new candidate combination of access commands. If the new candidate combination of access commands has a better estimated target value than the previous best target value, then the serial access optimizer 326 retains the new and better estimated target value. In case of a tie between two estimated target values, the serial access optimizer 326 may make an arbitrary selection or implement a tie-breaker by minimizing yet another target value, such as the number of handles.

In some systems, read commands perform better if they are aligned to certain boundaries, such as 8 KB or 64 KB boundaries. The serial access optimizer 326 can track such boundary read features, send a read command to the aligned boundary, and ignore the additional data sent. The same performance benefit may apply for I/O length if the input length or the output length is a multiple of some specific system-based length. Alignment optimizations may be applied under the provision that the serial access optimizer 326 is not minimizing bandwidth as the primary optimization target.

Some computer systems have a maximum read size, such that one read command cannot manage more than a specific size of data. When longer sections of data are to be read, whether more than the maximum read size is needed or the serial access optimizer 326 is not sending commands which "read through" non-accessed sections for optimizing purposes, the serial access optimizer 326 takes this maximum read size into account in the calculations. Consequently, the serial access optimizer 326 may increase the number of read commands, which may affect both the time and the cost of such a combination of access commands.

In addition to read optimization, writes may be optimized if the system which hosts the serial access resource supports multi-parallel-writer handles on the same serial access resource. Assuming this system support, a write command may benefit from optimization caused by a preceding seek command, similar to the benefits for a read command. Performing a "write through" combination of access commands that is similar to the "read through" combination of access commands is unlikely unless either the client has the data to overrun the target correctly, or that the open command and the seek command which precede a write command are so slow that it is better to read the intermediate sections between the targeted access sections and then write the targeted data along with the intermediate data in one write command. An example where this "write-though" would be beneficial is when compression is used, and the whole target needs to be updated anyway, such that a preceding read of the intermediate section's data is mandatory.

In addition to read and write commands, in many systems there are additional commands that may be managed the same way, such as a batch read command, a batch write command, a batch copy command, a fast copy command, or a clone command. The serial access optimizer 326 can determine whether it beneficial to use a read command and a write command or to use a copy command to copy sections of an object to a new location and then update the copy instead of using a read command and a write command. Since there are measurable alternatives of any access command, the decision of which option to select may be made by the serial access optimizer 326 for optimal conditions.

If more than one target is selected for optimization, then the order or priority of the targets may be defined. For example, the serial access optimizer 326 first minimizes for bandwidth, such as by initially selecting options #1, #2 & #7 which all have the same minimum bandwidth. as depicted in the table 200 by FIG. 2. Then the serial access optimizer 326 minimizes for time, as options #1, #2 & #7 have different parallel processing of commands and resource use that can affect which of these options for combinations of access commands are selected as the fastest performance among the options with the same minimized bandwidth.

Parallel processing of commands minimizes only the estimated target value for the optimization of time. In theory, handles may be processed in parallel so that the maximum parallel processing of commands is based on the number of handles. Other constraints can affect the maximum parallel processing of commands. For a naïve approximation, the serial access optimizer 326 can divide the estimated total processing time for commands by the maximum parallel processing value to estimate the average processing time and use that average processing time for as the minimized target value for time, which is a sufficient approximation if the sizes of the sections which are read do not vary too widely.

The target value for optimizing time may be estimated by dividing the number of handles by the number of available parallel processes, but the number of handles may not be divisible by the number of available parallel processes. For example: if the storage array 312 has 5 handles and the number of available parallel processes is 3, then the storage array 312 uses the first 3 handles in parallel during a first time period, and then uses the 2 remaining handles during a second time period, which means that the actual performance time is 2 time periods, instead of dividing 5 handles by 3 parallel processes to estimate a value of 5/3 time periods. The serial access optimizer 326 may round such a fractional estimated target value for time up to the nearest integer value, but if many serial access resources are managed at once, then using the fractional average value provides a better approximation across the storage array 312.

The actual target value for time is a function of the longest time to process a command. If one section of a serial access resource is significantly larger than another section of the serial access resource, or for other reasons one section requires much more time to process than required by other sections, the largest section is the constraint and defines the actual target value for time. If multiple handles are used, then the combination of access commands performed on the critical path which determines the time is the constraint which may be minimized by calculating the best processing order or by processing from the longest section to the shortest section, which is an excellent approximation.

The maximum parallel processing of commands is also affected by system constraints. The higher the number of parallel processes, the more memory and CPU resources are needed in the system that stores the serial access resource, such as the requesting client or the managing server. Any of these may limit the maximum number of parallel processes according to the system resources. Also, systems may have maximum global handle/stream counts that constrain the parallel processes which use handles. The serial access optimizer 326 tracks such system constraints and can derive the resulting parallel processes which are available and then calculate accordingly.

The serial access optimizer 326 may use more than one handle to read one section by opening two handles, and use one handle to read from the beginning of the section to the middle of the section, and use the other handle to read from the middle of the section to the end of the section. If the serial access optimizer 326 has enough parallel processing resources and enough bandwidth, in theory it is always better for the serial access optimizer 326 to split any size of section, because the serial access optimizer 326 can perform open, seek, read, and close commands in parallel for both handles, such that there is no significant downside to splitting a section. But in practical situations every open command and each handle's access commands have an overhead.

Although this splitting of a section may be done for any size of the section, such section splitting may be beneficial only if a section is sufficiently large. While splitting is possible for any section size (if there are enough parallel processing resources available) a good determination for a sufficiently large section is:

$$\text{Section Threshold} = \text{Section Size}/BW_{Read} > (T_{Open} + T_{Seek} + T_{Read}) * (1 + \text{System Error Rate})$$

In other words, if a section is so long that the data transfer time of the section is more than the handle initialization time (open command, seek command, and read command), then splitting the section may be beneficial. The system error rate is the average probability that an access command may fail. On an ideal error free system, the system error rate equals zero, such that the use of any threshold would determine that splitting a section is beneficial. As the system error rate increases, the serial access optimizer 326 may not split a section because if the error handling is high enough to significantly increase processing time. Practical values may put the threshold for the system error rate at least at 0.5%, but the actual system error rate may be higher.

Although the following paragraphs describe Dell Corporation's PowerProtect® backup/restore application, Dell Corporation's NetWorker® backup/restore application, and Dell Corporation's Avamar® backup/restore application as examples of the backup/restore application 324, the backup/restore application 324 may be any other type of backup/restore application which provides the backup/restore functionalities described in the Background section. The backup server 310 may be any other type of backup server which provides the backup/restore functionalities described in the Background section.

The backup/restore application 324 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 324 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 324 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The system 300 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk for 6 months, store a primary clone of the backup copies onto the second disk for 1 year, and store a secondary clone of the backup copies onto a tape, which is not depicted in FIG. 3, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored, such as the storage array 312.

Figure 4:
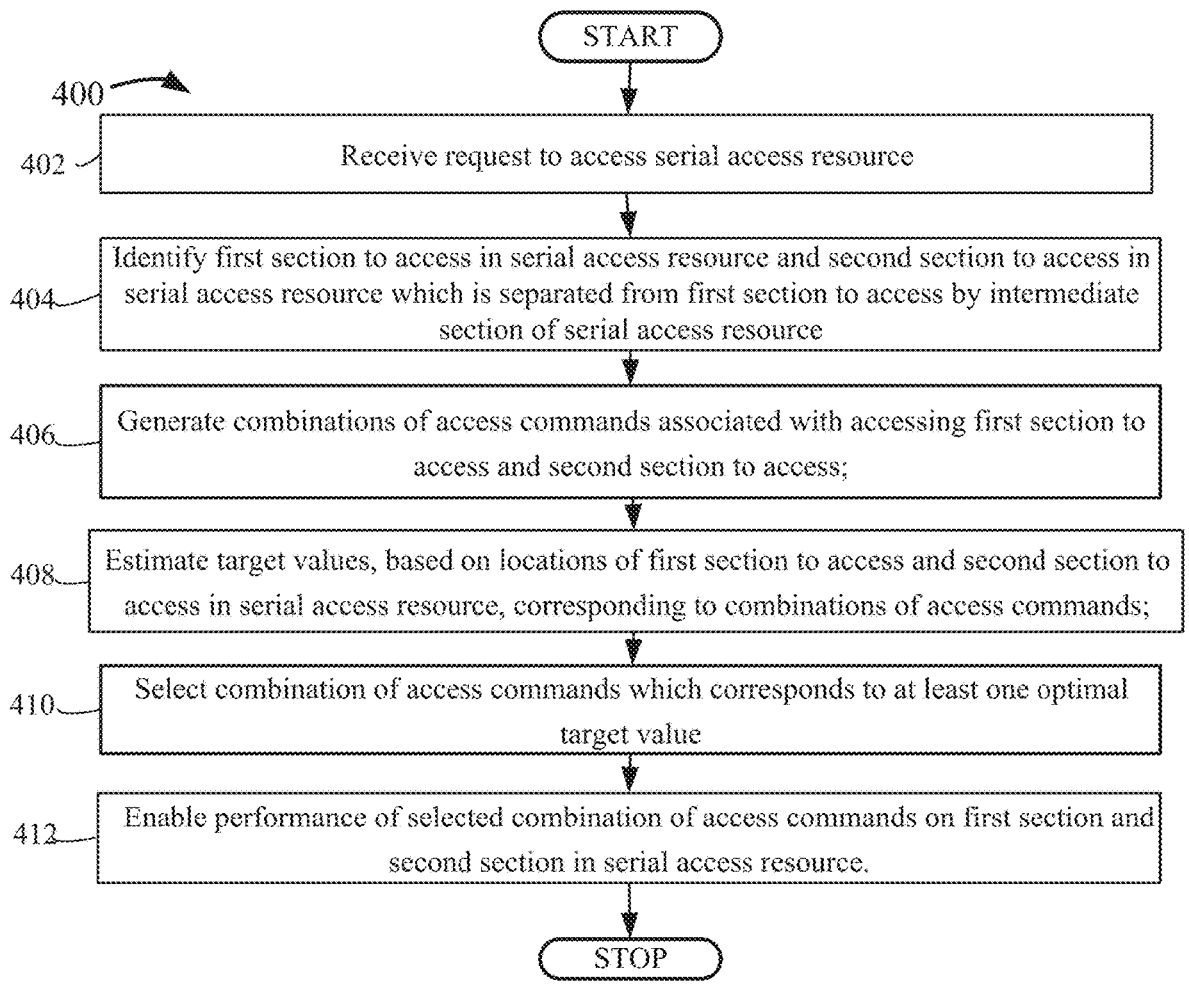
FIG. 4 is a flowchart that illustrates an example method for run-time selection of optimal commands for accessing serial access resources, under an embodiment.

FIG. 4 is a flowchart that illustrates a method for run-time selection of optimal commands for accessing serial access resources, under an embodiment. Flowchart 400 depicts method acts illustrated as flowchart blocks for certain steps involved in the clients 302-308, the server 310, the storage array 312, the cloud tier 314, and/or the network 322, of FIG. 3.

A request is received to access a serial access resource, block 402. A system processes requests to access serial access resources. For example, and without limitation, this can include the serial access optimizer 326 on the laptop computer 302 receiving a request from the laptop's user to partially restore a file from a backup file 328 stored on the storage array 312. The serial access resource may be the data file 328, the data stream 330, or an object store element 332. A request can be an instruction to a computer to provide information or perform another function. A data file can be a persistent record of binary information. A data stream can be a sequence of digitally encoded information. An object store element can be a persistent record of binary information stored by a cloud storage platform.

After receiving a request to access a serial access resource, a first section to access in the serial access resource and a second section to access in the serial access resource which is separated from the first section to access by an intermediate section in the serial access resource, are identified, block 404. The system identifies non-contiguous data to access on a serial access resource. By way of example and without limitation, this can include the serial access optimizer 326 identifying the sections of the backup file 328 which store data needed for a partial restore, which includes the sections A, B, C, D, and E, as depicted by the serial access resource 100 in FIG. 1. As specified by the table 102 depicted in FIG. 1, the section A is located at the addresses 256 KB to 319 KB, the section B is located at the addresses 384 KB to 447 KB, and the intermediate section between the section A and the section B is located at the addresses 320 KB to 383 KB. A section can be any of the distinct parts into which something is divided. An intermediate section can be any of the distinct parts into which something is divided and which comes between two other part in place or order.

Following the identification of the first and second sections to access, combinations of access commands are generated for accessing the first section to access and the second section to access, block 406. The system enumerates possible combinations of access commands for accessing non-contiguous sections of a serial access resource. In embodiments, this can include the serial access optimizer 326 generating at least the 7 combinations of access commands listed in the table 200 which can read the sections A, B, C, D, and E in the backup file 328. The combinations of access commands may include an open command, a seek command, a read command, a write command, and/or a close command.

A combination can be a group of different elements. An access command can be an instruction that causes a computer to use a digital resource. An open command can be an instruction that causes a computer to make a digital resource available for use. A seek command can be an instruction that causes a computer to find a location on a digital resource. A read command can be an instruction that causes a computer to retrieve data from a digital resource. A write command can be an instruction that causes a computer to store data on a digital resource. A close command can be an instruction that causes a computer to stop making a digital resource available for use.

Having generated combinations of access commands, target values are estimated, based on locations of the first section to access and the second section to access in the serial access resource, corresponding to the combinations of access commands, block 408. The system enumerates possible commands to access non-contiguous sections of a serial access resource. For example, and without limitation, this can include the serial access optimizer 326 estimating the total data read, which is listed in the KB read column 202, the total number of open, seek, read, and close commands, which is listed in the total commands column 204, and the time required to execute open, seek, read, and close commands, and transfer data, which is listed in the total commands column 206 for each of the 7 combinations of access commands. Estimating the target values may be further based on historical performance data for access commands. An optimal target value may be measured by a bandwidth, a number of access commands, a time, a cost, a memory use, and a Central Processor Unit (CPU) use. For an example which uses arbitrary values, open commands have historically averaged 200 milliseconds (ms), seek commands have historically averaged 10 milliseconds, read commands have historically averaged an overhead of 5 milliseconds, and close commands have historically averaged 200 milliseconds, with the cumulative time required for performing the total number of commands being adjusted for the access commands which are performed in parallel. Continuing the example, read commands have historically averaged transferring data at 200 Megabytes (MB) per second, which is 200 KB per millisecond.

A target value can be a numerical amount toward which efforts are directed. A location can be a particular place or position. Historical performance data can be information about a previous action. An optimal target value can be a numerical amount toward which efforts are directed and is most favorable.

A bandwidth can be an amount of data transmitted. A number can be a count. A time can be a chronological measure. A cost can be an expense. A memory use can be an amount of data consumed on a storage device. A Central Processor Unit (CPU) use can be a consumption measure for the computer system component that controls the interpretation and execution of instructions.

After estimating target values, a combination of access commands which corresponds to an optimal target value is selected, block 410. The system selects the optimal combination of access commands for accessing the non-contiguous sections on the serial access resource. By way of example and without limitation, this can include the serial access optimizer 326 using the total number of commands listed in the total commands column 204 for options #1, #2, and #7 as a tie-breaker for selecting optimal commands, because options #1, #2, and #7 for the combinations of access commands each have the same minimum of 448 KB of data read in the KB read column 202. Identifying the minimized total commands as the tiebreaker for options #1, #2, and #7 results in selecting option #1, which has 12 open, seek, read, and close commands, whereas option #2 has 20 open, seek, read, and close commands, and option #7 has 16 open, seek, read, and close commands.

The serial access optimizer 326 could have used the time required, which is listed in the time required column 206 for options #1, #2, and #7, as a tie-breaker for selecting optimal commands, because options #1, #2, and #7 for the combinations of access commands each have the same minimum of 448 KB of data read in the KB read column 202. Identifying the minimized time required as the tiebreaker for options #1, #2, and #7 results in selecting option #2, which required 415.64 milliseconds, whereas option #1 required 477.24 milliseconds, and option #7 required 431.28 milliseconds.

Following the selection of an optimal combination of access commands for accessing the non-contiguous sections in the serial access resource, the selected combination of access commands is enabled to be performed on the first section and the second section in the serial access resource, block 412. The system performs optimal commands to access non-contiguous sections in serial access resources. In embodiments, this can include the serial access optimizer 326 sending the selected combination of access commands for option #1, which are 1 open command, 5 read commands, 5 seek commands, and 1 close command to the backup file 328 on the storage array 312, which performs the optimal commands for open the backup file, seek the section A, read the section A, seek the section B, read the section B, seek the section C, read the section C, seek the section D, read the section D, seek the section E, read the section E, and close the backup file. If only the total number of commands was optimized, the serial access optimizer 326 would have selected option #3, which requires only 1 open command, 1 seek command, 1 read command, and 1 close command for a total of only 4 commands, and sent the commands for open the backup file, seek the section A, read the sections A through E, and close the backup file. If the only target value selected for optimization was the time required, the serial access optimizer 326 would have selected option #2, which is the estimate of the fastest performance, requiring only 415.64 milliseconds, and sent the commands for using 5 handles to open the backup file in parallel, 5 handles to seek the sections A, B, C, D, and E in parallel, 5 handles to read the sections A, B, C, D, and E in parallel, and 5 handles to close the backup file in parallel. A selected combination can be a chosen group of different elements.

Enabling performance of the selected combination of access commands may include performing a command of the selected combination of commands on the first section while performing the command of the selected combination of commands on the second section. For example, instead of the storage array 312 using one handle to perform the optimal commands for . . . seek the section A, read the section A, seek the section B, read the section B . . . the storage array 312 uses two handles to perform the optimal commands, by using a first handle to seek the section A while using a second handle to simultaneously seek the section B, then using the first handle to read the section A while using the second handle to read the section B in parallel. A command can be an instruction or signal that causes a computer to perform one of its basic functions.

Enabling performance of the selected combination of access commands may include performing a command of the selected combination of commands on a first part of the first section while performing the command of the selected combination of commands on a second part of the first section. For example, instead of the storage array 312 using one handle to perform the optimal commands for . . . seek the section C, read the section C . . . since the section C is 128 KB and twice the size of the section A and the section B, the serial access optimizer 326 can split the section C into two subsections of 64 KB each, and then the storage array 312 can use two handles to perform the optimal commands, by using a first handle to read the first subsection C from address 512 KB to 575 KB while using a second handle to simultaneously read the second subsection C from address 576 KB to 639 KB. A part can be a piece of something such as a resource, which combined with other pieces makes up the whole resource.

Enabling performance of the selected combination of access commands on the first section and the second section may include performing one access command from a beginning location of the first section to an ending location of the second section, in response to a determination that the intermediate section does not satisfy a threshold. For example, since the intermediate section between the section A and the section B is only 64 KB, which is less than the threshold of 128 KB, the storage array 312 uses one handle to perform the optimal commands, beginning the read command at the address 256 KB, which is the beginning location for the section A, continuing the read command through the section A, the intermediate section, and the section B, ending the read command at address 447 KB, which is the ending location for the section B, and then performing a seek command for the section C. A beginning location can be the initial place or position. An ending location can be the last place or position. A threshold can be the magnitude that must be exceeded or met for a certain result to occur.

Enabling performance of the selected combination of access commands on the first section and the second section may include performing a first access command from a beginning location of the first section to an ending location of the first section, performing a seek command from the ending location of the first section to a beginning location of the second section, and then performing the first access command from the beginning location of the second section to the ending location of the second section, in response to a determination that the intermediate section satisfies a threshold. For example, since the intermediate section between the section C and the section D is 1,408 KB, which is greater than the threshold of 128 KB, the storage array 312 uses one handle to perform the optimal commands, . . . read the section C, seek the section D, read the section D . . . .

Although FIG. 4 depicts the blocks 402-412 occurring in a specific order, the blocks 402-412 may occur in another order. In other implementations, each of the blocks 402-412 may also be executed in combination with other blocks and/or some blocks may be divided into a different set of blocks.

Figure 5:
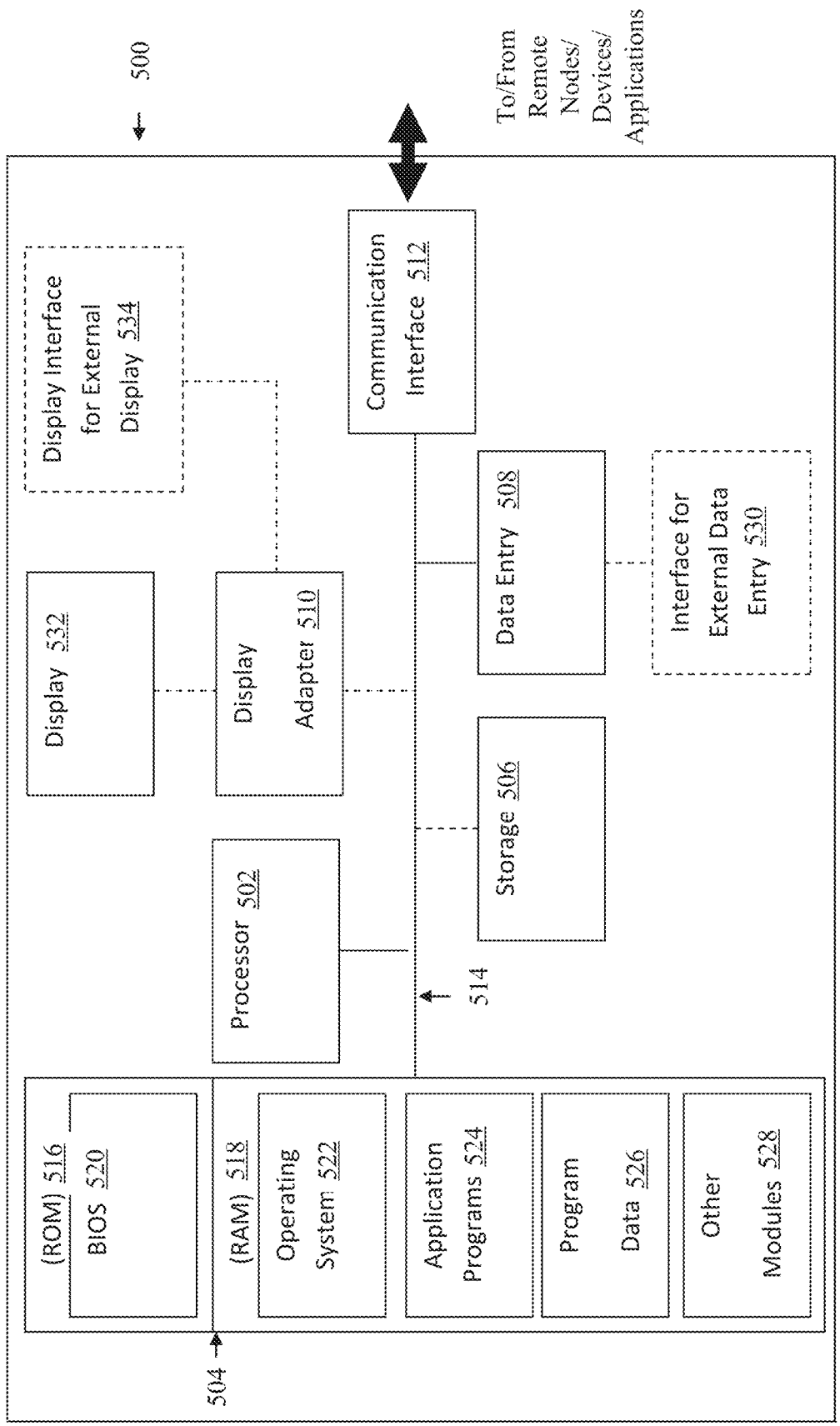
FIG. 5 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random-access memory (RAM) 518. The memory 504 may be configured to store program instructions and data during operation of the hardware device 500. In various embodiments, the memory 504 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 500. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530.

By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device, or other common network node, and typically includes many or all the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

The arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for run-time selection of optimal commands for accessing serial access resources, comprising:
   one or more processors; and
   a non-transitory computer readable medium storing a plurality of instructions, which when executed, cause the one or more processors to:
   identify a first section to access in a serial access resource and a second section to access in the serial access resource which is separated from the first section to access by an intermediate section in the serial access resource, in response to receiving a request to access the serial access resource;
   generate combinations of access commands associated with accessing the first section to access and the second section to access;
   estimate a plurality of target values, based on locations of the first section to access and the second section to access in the serial access resource, corresponding to the combinations of access commands;
   select a combination of access commands, of the combinations of access commands, which corresponds to at least one optimal target value of the plurality of target values;
   enable performance of the selected combination of access commands on the first section and the second section in the serial access resource.

2. The system of claim 1, wherein the serial access resource comprises one of a data file, a data stream, and an object store element, and the combinations of access commands comprise at least one of an open command, a seek command, a read command, a write command, and a close command.

3. The system of claim 1, wherein estimating the plurality of target values is further based on historical performance data for access commands, and the at least one optimal target value is measured by one of a bandwidth, a number of access commands, a time, a cost, a memory use, and a Central Processor Unit (CPU) use.

4. The system of claim 1, wherein enabling performance of the combination of access commands comprises performing a command of the selected combination of access commands on the first section while performing the command of the selected combination of access commands on the second section.

5. The system of claim 1, wherein enabling performance of the combination of access commands comprises performing a command of the selected combination of access commands on a first part of the first section while performing the command of the selected combination of access commands on a second part of the first section.

6. The system of claim 1, wherein enabling performance of the combination of access commands on the first section and the second section comprises performing one access command from a beginning location of the first section to an ending location of the second section, in response to a determination that the intermediate section does not satisfy a threshold.

7. The system of claim 1, wherein enabling performance of the combination of access commands on the first section and the second section comprises performing a first access command from a beginning location of the first section to an ending location of the first section, performing a seek command from the ending location of the first section to a beginning location of the second section, and then performing the first access command from the beginning location of the second section to the ending location of the second section, in response to a determination that the intermediate section satisfies a threshold.

8. A computer-implemented method for run-time selection of optimal commands for accessing serial access resources, the computer-implemented method comprising:
identifying a first section to access in a serial access resource and a second section to access in the serial access resource which is separated from the first section to access by an intermediate section in the serial access resource, in response to receiving a request to access the serial access resource;
generating combinations of access commands associated with accessing the first section to access and the second section to access;
estimating a plurality of target values, based on locations of the first section to access and the second section to access in the serial access resource, corresponding to the combinations of access commands;
selecting a combination of access commands, of the combinations of access commands, which corresponds to at least one optimal target value of the plurality of target values;
enabling performance of the selected combination of access commands on the first section and the second section in the serial access resource.

9. The computer-implemented method of claim 8, wherein the serial access resource comprises one of a data file, a data stream, and an object store element, and the combinations of access commands comprise at least one of an open command, a seek command, a read command, a write command, and a close command.

10. The computer-implemented method of claim 8, wherein estimating the plurality of target values is further based on historical performance data for access commands, and the at least one optimal target value is measured by one of a bandwidth, a number of access commands, a time, a cost, a memory use, and a Central Processor Unit (CPU) use.

11. The computer-implemented method of claim 8, wherein enabling performance of the combination of access commands comprises performing a command of the selected combination of access commands on the first section while performing the command of the selected combination of access commands on the second section.

12. The computer-implemented method of claim 8, wherein enabling performance of the combination of access commands comprises performing a command of the selected combination of access commands on a first part of the first section while performing the command of the selected combination of access commands on a second part of the first section.

13. The computer-implemented method of claim 8, wherein enabling performance of the combination of access commands on the first section and the second section comprises performing one access command from a beginning location of the first section to an ending location of the second section, in response to a determination that the intermediate section does not satisfy a threshold.

14. The computer-implemented method of claim 8, wherein enabling performance of the combination of access commands on the first section and the second section comprises performing a first access command from a beginning location of the first section to an ending location of the first section, performing a seek command from the ending location of the first section to a beginning location of the second section, and then performing the first access command from the beginning location of the second section to the ending location of the second section, in response to a determination that the intermediate section satisfies a threshold.

15. A computer program product, comprising a non-transitory computer-readable medium having a computer-readable program code embodied therein to be executed by one or more processors, the program code including instructions to:
identify a first section to access in a serial access resource and a second section to access in the serial access resource which is separated from the first section to access by an intermediate section in the serial access resource, in response to receiving a request to access the serial access resource;
generate combinations of access commands associated with accessing the first section to access and the second section to access;
estimate a plurality of target values, based on locations of the first section to access and the second section to access in the serial access resource, corresponding to the combinations of access commands;
select a combination of access commands, of the combinations of access commands, which corresponds to at least one optimal target value of the plurality of target values;
enable performance of the selected combination of access commands on the first section and the second section in the serial access resource.

16. The computer program product of claim 15, wherein the serial access resource comprises one of a data file, a data stream, and an object store element, the combinations of access commands comprise at least one of an open command, a seek command, read command, a write command, and a close command, estimating the plurality of target values is further based on historical performance data for access commands, and the at least one optimal target value is measured by one of a bandwidth, a number of access commands, a time, a cost, a memory use, and a Central Processor Unit (CPU) use.

17. The computer program product of claim 15, wherein enabling performance of the combination of access commands comprises performing a command of the selected combination of access commands on the first section while performing the command of the selected combination of access commands on the second section.

18. The computer program product of claim 15, wherein enabling performance of the combination of access commands comprises performing a command of the selected combination of access commands on a first part of the first section while performing the command of the selected combination of access commands on a second part of the first section.

19. The computer program product of claim 15, enabling performance of the selected combination of access commands on the first section and the second section comprises performing one access command from a beginning location of the first section to an ending location of the second section, in response to a determination that the intermediate section does not satisfy a threshold.

20. The computer program product of claim 15, enabling performance of the selected combination of access commands on the first section and the second section comprises performing a first access command from a beginning location of the first section to an ending location of the first section, performing a seek command from the ending location of the first section to a beginning location of the second section, and then performing the first access command from the beginning location of the second section to the ending location of the second section, in response to a determination that the intermediate section satisfies a threshold.

* * * * *